(12) United States Patent
Musolin et al.

(10) Patent No.: US 9,940,884 B1
(45) Date of Patent: *Apr. 10, 2018

(54) AUTOMATED DIMMER WALL SWITCH WITH A COLOR MULTI-TOUCH LCD/LED DISPLAY

(71) Applicants: Sergey Musolin, Alexandria, VA (US); Alexander Uchenov, Alexandria, VA (US)

(72) Inventors: Sergey Musolin, Alexandria, VA (US); Alexander Uchenov, Alexandria, VA (US)

(73) Assignees: Sergey Musolin, Moscow (RU); Alexander Uchenov, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,580

(22) Filed: Apr. 25, 2016

Related U.S. Application Data

(63) Continuation-in-part of application No. 13/970,925, filed on Aug. 20, 2013, now Pat. No. 9,326,407.

(60) Provisional application No. 61/754,583, filed on Jan. 20, 2013, provisional application No. 61/695,745, filed on Aug. 31, 2012.

(51) Int. Cl.
| | |
|---|---|
| *H04N 7/18* | (2006.01) |
| *G06F 3/0484* | (2013.01) |
| *G09G 3/36* | (2006.01) |
| *G06F 3/0481* | (2013.01) |

(52) U.S. Cl.
CPC ....... *G09G 3/3607* (2013.01); *G06F 3/04817* (2013.01); *G06F 3/04847* (2013.01); *H04N 7/183* (2013.01); *G09G 2354/00* (2013.01); *G09G 2360/144* (2013.01)

(58) Field of Classification Search
CPC .................................. H02G 3/08; H05K 7/00
See application file for complete search history.

(56) References Cited

U.S. PATENT DOCUMENTS

| | | | | |
|---|---|---|---|---|
| 5,107,918 A | * | 4/1992 | McFarlane | G05D 23/1917 165/238 |
| 5,499,935 A | * | 3/1996 | Powell | H01R 13/66 439/182 |
| 5,566,879 A | * | 10/1996 | Longtin | G05D 23/1905 165/205 |
| 6,692,093 B1 | * | 2/2004 | Park | F16M 11/10 312/319.7 |

(Continued)

*Primary Examiner* — David M Sinclair
*Assistant Examiner* — Theron S Milliser
(74) *Attorney, Agent, or Firm* — Bardmesser Law Group

(57) ABSTRACT

An automated dimmer switch is provided. The dimmer has a color sensor display embodied into plastic or metal housing. The dimmer includes a mother board, a central processor for processing incoming data, an operating memory and a flash memory. The dimmer also has various sensors for use with corresponding smart home technologies and a wireless module for connecting to a network standard IEEE 802.11a/b/n utilizing different internet protocols and chips for other wireless technologies such as Bluetooth and Z-Wave/Zigbee. The dimmer can include a motion sensor, such that the display image changes gradually from stand-by mode to display of interface icons for dimmer operation. The stand-by mode image when not in operation is derived from surrounding wall texture.

19 Claims, 20 Drawing Sheets

(56) References Cited

U.S. PATENT DOCUMENTS

| | | | | |
|---|---|---|---|---|
| 7,222,800 B2* | 5/2007 | Wruck | | C09D 5/4492 |
| | | | | 165/11.1 |
| 7,614,567 B2* | 11/2009 | Chapman, Jr. | | F24D 19/10 |
| | | | | 236/1 C |
| D610,027 S * | 2/2010 | Li | | D10/103 |
| 7,778,736 B2* | 8/2010 | Sutardja | | A01G 25/16 |
| | | | | 700/276 |
| 8,829,799 B2* | 9/2014 | Recker | | H02J 9/02 |
| | | | | 315/159 |
| 2002/0124992 A1* | 9/2002 | Rainer | | F24F 11/006 |
| | | | | 165/11.1 |
| 2004/0260427 A1* | 12/2004 | Wimsatt | | G05B 15/02 |
| | | | | 700/275 |
| 2005/0001557 A1* | 1/2005 | Walko, Jr. | | H05B 37/0272 |
| | | | | 315/149 |
| 2005/0033593 A1* | 2/2005 | Abrams | | G06Q 10/025 |
| | | | | 705/302 |
| 2005/0090915 A1* | 4/2005 | Geiwitz | | G05B 15/02 |
| | | | | 700/90 |
| 2005/0125083 A1* | 6/2005 | Kiko | | G05B 15/02 |
| | | | | 700/19 |
| 2005/0127866 A1* | 6/2005 | Hamilton | | G06K 7/10891 |
| | | | | 320/108 |
| 2005/0162115 A1* | 7/2005 | Pendergrass | | H03K 17/94 |
| | | | | 318/480 |
| 2005/0195757 A1* | 9/2005 | Kidder | | H04W 60/00 |
| | | | | 370/278 |
| 2006/0060658 A1* | 3/2006 | Proffitt | | F24F 11/0012 |
| | | | | 236/1 C |
| 2006/0102731 A1* | 5/2006 | Mueller | | F23N 5/203 |
| | | | | 236/51 |
| 2006/0131434 A1* | 6/2006 | Butler | | F24F 11/0012 |
| | | | | 236/1 C |
| 2006/0151678 A1* | 7/2006 | Shibata | | G01J 1/32 |
| | | | | 250/205 |
| 2006/0250745 A1* | 11/2006 | Butler | | H05B 37/0281 |
| | | | | 361/160 |
| 2007/0176566 A1* | 8/2007 | Fukumoto | | H05B 41/24 |
| | | | | 315/291 |
| 2007/0208460 A1* | 9/2007 | Pienta | | G05D 23/1905 |
| | | | | 700/276 |
| 2007/0241203 A1* | 10/2007 | Wagner | | F24F 11/0034 |
| | | | | 236/1 C |
| 2008/0006709 A1* | 1/2008 | Ashworth | | F24F 11/0012 |
| | | | | 236/1 C |
| 2008/0034379 A1* | 2/2008 | Dale | | G06F 9/545 |
| | | | | 719/321 |
| 2008/0048046 A1* | 2/2008 | Wagner | | F24F 11/0012 |
| | | | | 236/91 R |
| 2008/0291643 A1* | 11/2008 | Farago | | H02B 1/044 |
| | | | | 361/747 |
| 2009/0140056 A1* | 6/2009 | Leen | | F24F 11/0086 |
| | | | | 236/49.3 |
| 2009/0239587 A1* | 9/2009 | Negron | | G06F 3/04883 |
| | | | | 455/566 |
| 2010/0070089 A1* | 3/2010 | Harrod | | F24F 11/0086 |
| | | | | 700/277 |
| 2010/0163713 A1* | 7/2010 | Cheng | | G06F 1/3203 |
| | | | | 250/214 AL |
| 2010/0193652 A1* | 8/2010 | Stajos | | A47F 5/0815 |
| | | | | 248/231.91 |
| 2010/0261465 A1* | 10/2010 | Rhoads | | G08C 17/00 |
| | | | | 455/420 |
| 2011/0080423 A1* | 4/2011 | Kerofsky | | G09G 3/3413 |
| | | | | 345/593 |
| 2011/0109538 A1* | 5/2011 | Kerr | | G09G 5/36 |
| | | | | 345/156 |
| 2011/0110023 A1* | 5/2011 | Rylski | | H05K 5/0243 |
| | | | | 361/679.01 |
| 2011/0118857 A1* | 5/2011 | Bodnar | | G05B 13/026 |
| | | | | 700/47 |
| 2011/0218831 A1* | 9/2011 | Bolling | | G06Q 10/02 |
| | | | | 705/5 |
| 2011/0312349 A1* | 12/2011 | Forutanpour | | G06F 1/1626 |
| | | | | 455/466 |
| 2012/0080944 A1* | 4/2012 | Recker | | H02J 9/02 |
| | | | | 307/25 |
| 2012/0106048 A1* | 5/2012 | Byeon | | H04N 5/64 |
| | | | | 361/679.01 |
| 2012/0203379 A1* | 8/2012 | Sloo | | F24F 11/0086 |
| | | | | 700/276 |
| 2013/0075579 A1* | 3/2013 | Chen | | G01J 1/4204 |
| | | | | 250/205 |
| 2013/0120922 A1* | 5/2013 | Castle | | G06F 1/1601 |
| | | | | 361/679.08 |
| 2013/0147723 A1* | 6/2013 | Bias | | F24F 11/0086 |
| | | | | 345/173 |
| 2013/0328944 A1* | 12/2013 | Barnhoefer | | G09G 3/006 |
| | | | | 345/690 |
| 2013/0345882 A1* | 12/2013 | Dushane | | G05B 15/02 |
| | | | | 700/276 |
| 2014/0094936 A1* | 4/2014 | Saunders | | G05B 15/02 |
| | | | | 700/17 |

\* cited by examiner

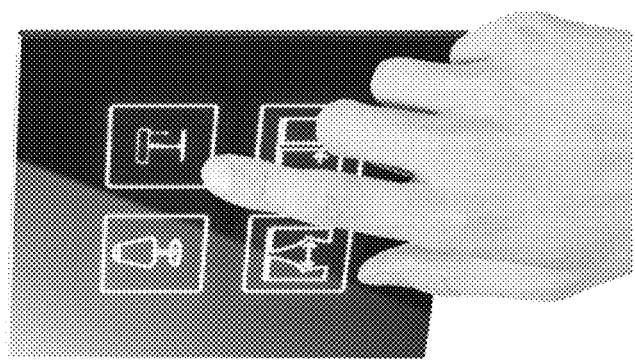
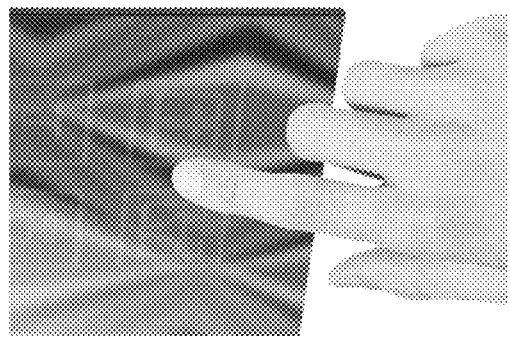
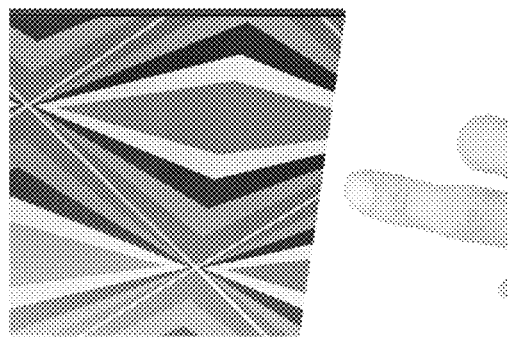
FIG.16

AUTOMATED DIMMER WALL SWITCH WITH A COLOR MULTI-TOUCH LCD/LED DISPLAY

CROSS-REFERENCE TO RELATED APPLICATIONS

This application is a continuation in part of U.S. patent application Ser. No. 13/970,925, filed on Aug. 20, 2013, which claims priority to Provisional U.S. Patent Application No. 61/695,745, filed on Aug. 31, 2012 and to Provisional U.S. Patent Application No. 61/754,583 filed on Jan. 20, 2013 incorporated by reference herein in their entirety.

BACKGROUND OF THE INVENTION

Field of the Invention

This invention relates to light control systems, and in particular to a wall-mounted dimmer switch with a touch screen control.

Description of the Related Art

Conventional light switches are commonly used for connecting/disconnecting electrical circuits and turning on and off electric equipment.

A conventional electric switch is typically placed inside the wall or placed on the wall.

Another conventional device is a dimmer used for regulation of power levels. The dimmer is typically placed after the power source within the circuit. The dimmers are used for controlling electric lamps (regular or halogen or LED).

Accordingly, there is a need in the art for a convenient universal wall-mounted dimmer device that has a color multi-touch LCD/LED display used for settings and control of household devices.

SUMMARY OF THE INVENTION

Accordingly, the present invention is related to a dimmer with a multi-touch color LCD/LED display that substantially obviates one or more of the disadvantages of the related art.

In one embodiment, a dimmer switch is provided. The dimmer has a color multi-touch LCD/LED display embodied into plastic or metal housing. The dimmer includes a mother board, a central processor, RAM and, a flash memory, an audio processor with high sound quality and high performance suitable for compatible devices, a video processor if needed for displaying video, a touch screen controller, and a WiFi/Bluetooth/Z-wave/WLAN chip. The dimmer also includes different sensors: an ambient light sensor, a proximity sensor, a sound sensor/mobile sound speaker, a temperature sensor, a humidity/moisture sensor, etc.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 16 illustrates a gradual change from standby mode to interface mode as the hand is brought closer to the dimmer.

DETAILED DESCRIPTION OF THE PREFERRED EMBODIMENTS

Figure 1:
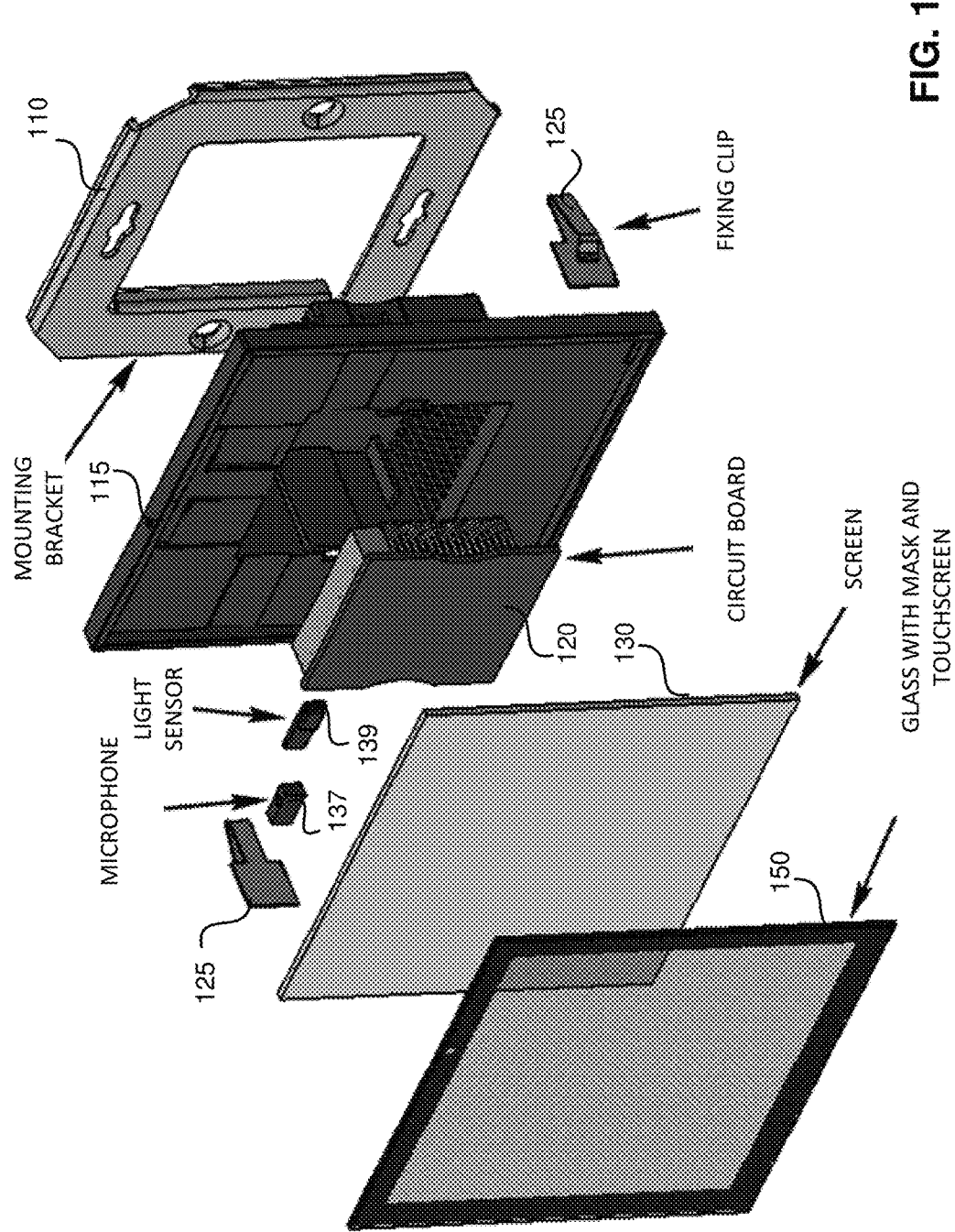
FIG. 1 illustrates a dimmer assembly, in accordance with the exemplary embodiment.

Reference will now be made in detail to the preferred embodiments of the present invention, examples of which are illustrated in the accompanying drawings.

According to an exemplary embodiment, a dimmer switch is provided that can be mounted in a standard wall socket. The dimmer has a color multi-touch LCD/LED display embedded into plastic or metal housing. More broadly, the display can be an OLED display which does not have/require LED backlight, or it can be based on the projector technique. Any flat or even curved display of any size and form with the capabilities to have multicolor pixels with high density and (optional) touch sensor.

The dimmer also includes a front panel, which can be made of plastic, glass or sapphire or some other transparent material shielding the device.

The dimmer includes a motherboard, a central processor for processing incoming data, a RAM, a flash memory, a WiFi/Bluetooth/Z-wave/Zigbee/WLAN chip, an audio processor with high sound quality and high performance suitable for compatible devices. Additionally, the dimmer has sensors: an ambient light sensor, a proximity sensor (for example, using an ultrasonic sensor of not only proximity of a person but also room occupancy, where the dimmer attempts to predict, based on the occupancy and the history, of environmental parameters desired by the occupants), a sound sensor/mobile sound speaker, a temperature sensor, a humidity/moisture sensor, etc.

According to the exemplary embodiment, the dimmer device is running a proprietary operating system (or, alternatively, by an operating system such as iOS/ANDROID/WINDOWS MOBILE, ANDROID for IoT devices, LINUX or VXWORKS). According to the exemplary embodiment, the dimmer can be also controlled by external mobile devices (for example, iOS/Android/Windows Mobile and/or other mobile platforms). The dimmer can be controlled through a web-portal or through the color multi-touch LCD/LED display integrated into the switch.

The dimmer can control household devices and other dimmers through the different wireless technologies, for example, through Wi-Fi, WLAN, Bluetooth, Z-wave/Zigbee, as well as using the X10 or HomePlug powerline industry standard. According to the exemplary embodiment, the dimmer serves as a central multifunctional device for controlling home appliances and other devices (such as other dimmers in other rooms, which can also be controlled by an app through the Internet or locally through wireless or wireline LAN by mobile or web or general app installed on any computer device—mobile, laptop, desktop, as well as being controlled locally through gestures, taps(touches), swipes or voice) without using any wires for connection to the home/household devices (or, optionally, using powerlines through the X10 or HomePlug standard). Power line communications can be supported for interconnection among switches and the entire house WiFi coverage using the dimmer.

A user can control all devices through a multi-touch LCD/LED display or mobile phones/tablets. For example, the user can control an air conditioner, lights, window blinds, etc. The dimmer can automatically control the environment using an ambient light sensor, a humidity/moisture sensor and a temperature sensor. In other words, a wireless control of all of the home appliances and equipment is provided.

According to the exemplary embodiment, the dimmer has a high resolution multi-touch display for displaying different data (i.e., a text, images and video data). The dimmer display can show temperature, time, date, etc. The dimmer can also display data received from other dimmers placed at different locations, for example, in other rooms, permitting control of lighting and other functions from one dimmer.

Additionally, the dimmer can be connected to a Wi-Fi or other wireless network and receive data pertaining to weather, outside temperature, humidity, etc. According to one exemplary embodiment, the dimmer can be controlled by hand movements performed within 10-15 cm from the display sensor. Thus, the light or other settings can be changed without looking at the display screen. The dimmer can have programmed movements for different settings. For example, a single/double touch and a subsequent hand movement from right to left can change the intensity of the lighting and the up/down hand movement can change the room temperature, waving a hand or fingers near the switch in specific patterns, e.g., left-right, up-down, clicking of fingers(motion or sound), clapping (motion or sound), etc.

Figure 19:
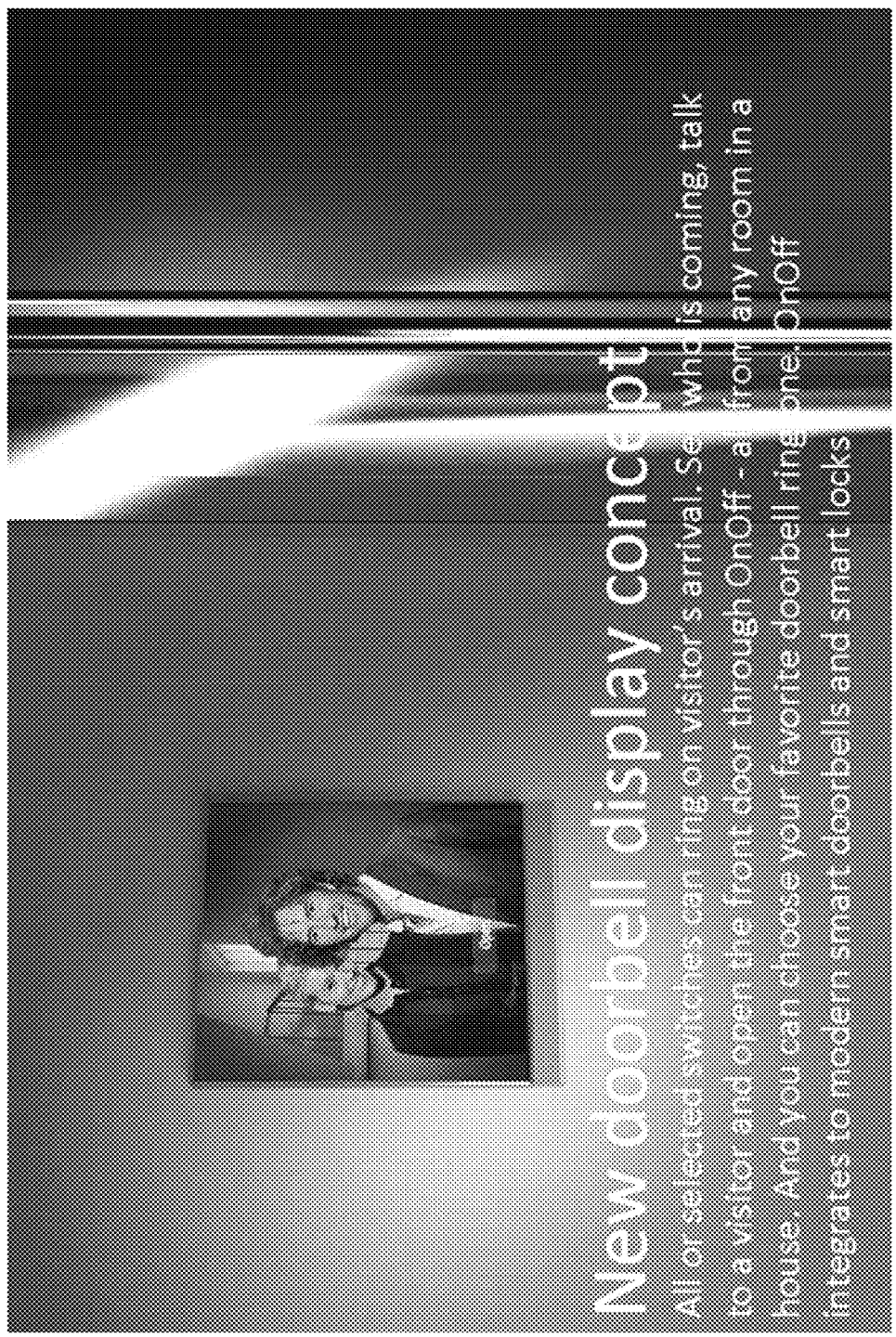
FIG. 19 shows that the dimmer can be connected to an entrance video camera and a door bell.
Figure 20:
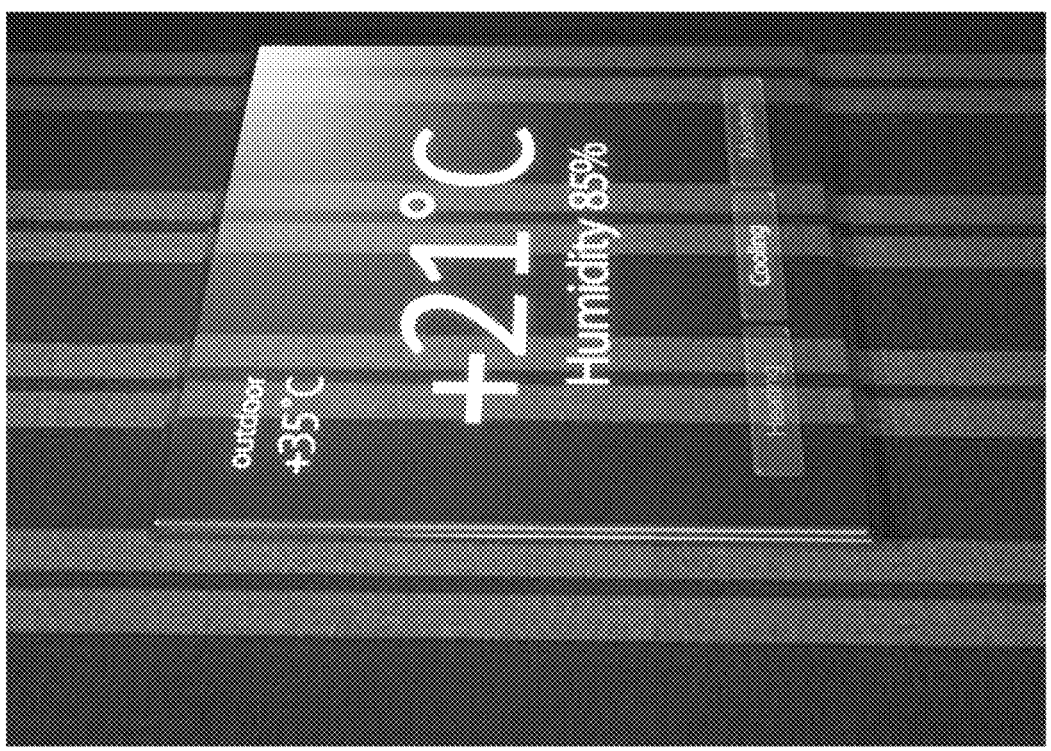
FIG. 20 illustrates the display screen of the dimmer having the same stand-by display as the wall texture and pattern.

The dimmer can display a video stream acquired by the video cameras placed outside. For example, the dimmer can be connected to an entrance video camera and a door bell (see FIG. 19). So the user can hear the door bell and see who is at the door through the dimmer display. According to the exemplary embodiment, a sound can be turned off (if needed) by an external manual switch. Each individual device installed in the house is decentralized. The devices can also be combined into a decentralized ad-hoc network controlled by the dimmer. The dimmer also includes power control circuit for controlling light bulbs (standard and smart light bulbs, and can also determine which light bulb (standard and/or smart light bulb) has failed, and send a notification to the user (e.g., to his telephone) of which light bulb/wattage/other parameter needs to be replaced/purchased for replacement.

Figure 12:
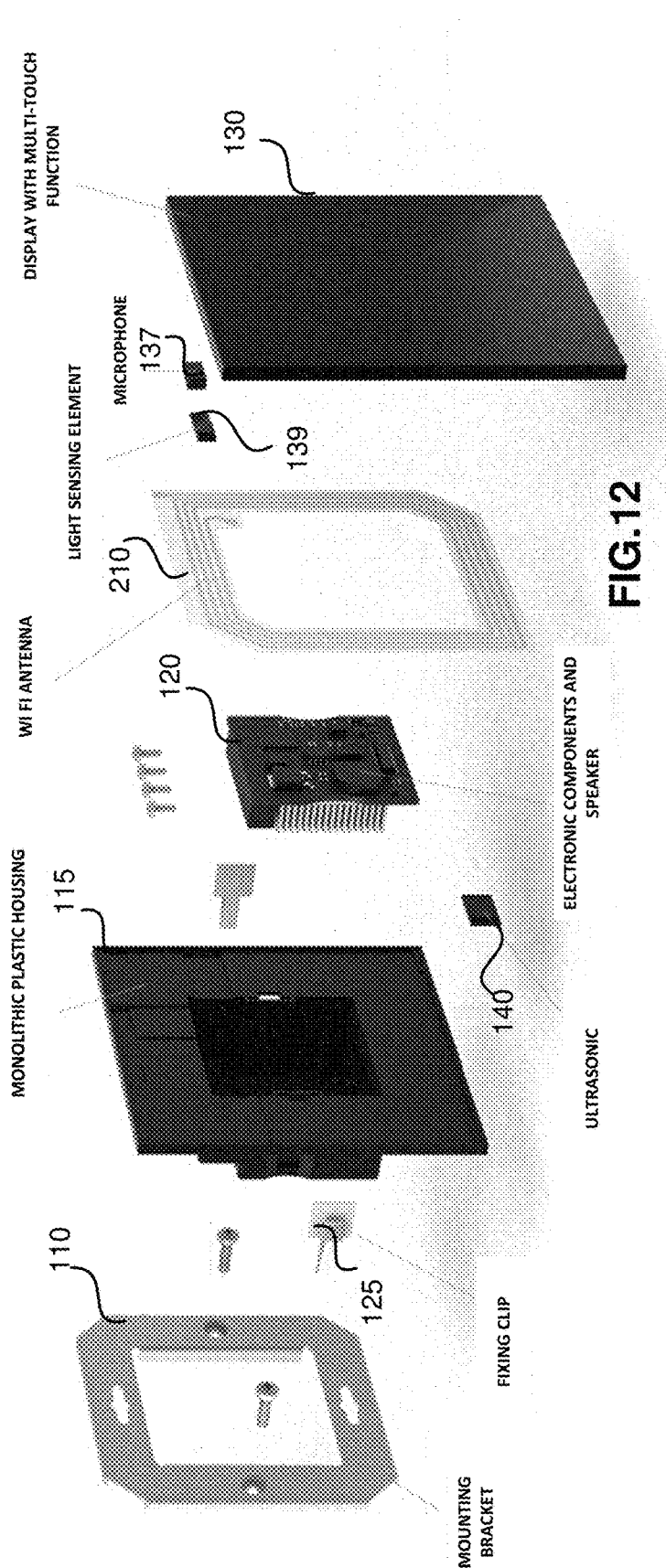
FIG. 12 illustrates a dimmer assembly, in accordance with another exemplary embodiment.
Figure 13:
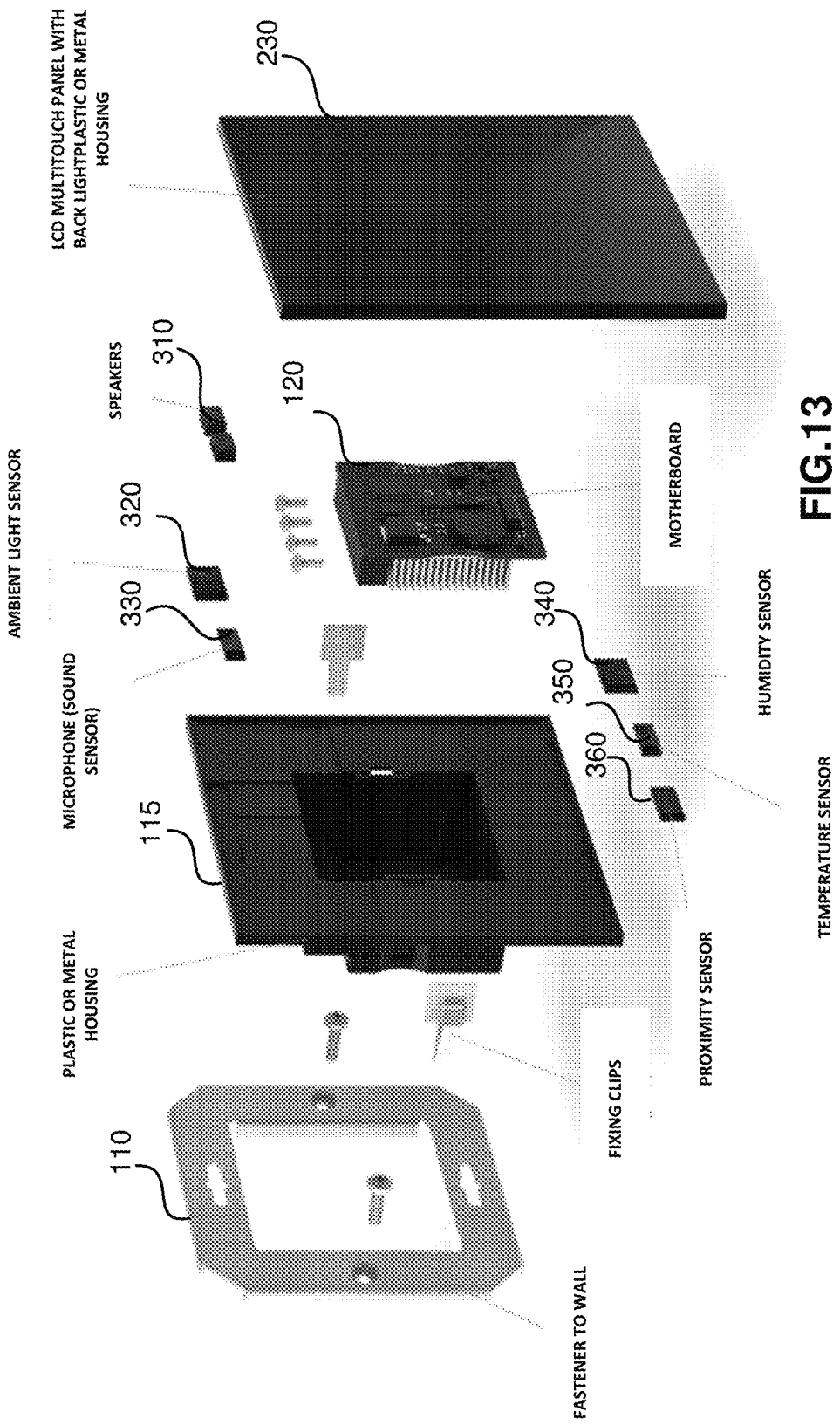
FIG. 13 illustrates a dimmer assembly, in accordance with another exemplary embodiment.

FIGS. 1, 12 and 13 illustrate dimmer assemblies, in accordance with the exemplary embodiments. The dimmer is placed into a housing (metal or plastic bracket) that attaches to the wall. The sensor display is placed on top of the dimmer and connected to the processor and the sensors. FIG. 1 illustrates a mounting bracket 110, a circuit board 120 placed into a housing 115, which connects to the mounting bracket by fixing clips 125. A light sensor 139 and a microphone 137 are integrated into the circuit board 120. The circuit board is coupled to a screen 130 covered with a touch screen mask 150.

FIGS. 12 and 13 illustrate the dimmer assembly, in accordance with another exemplary embodiment. The exemplary assembly includes a Wi-Fi antenna and different sensors. FIG. 12 illustrates a mounting bracket 110, a circuit board 120 placed into a housing 115, which connects to the mounting bracket by fixing clips 125. A light sensor 139, a microphone 137 and an ultrasonic element 140 are integrated into the circuit board 120. The circuit board 120 is coupled to a screen 130 covered with a touch screen mask 150. The dimmer uses a Wi-Fi antenna 210.

FIG. 13 illustrates a mounting bracket 110, a circuit board 120 placed into a housing 115, which connects to the mounting bracket by fixing clips 125. A microphone 137, an ambient light sensor 320, speakers 310, a proximity sensor 360, a temperature sensor 350, a humidity sensor 340 are integrated into the mother board 120. The mother board 120 is coupled to an LCD panel 130 covered with a housing.

Figure 2:
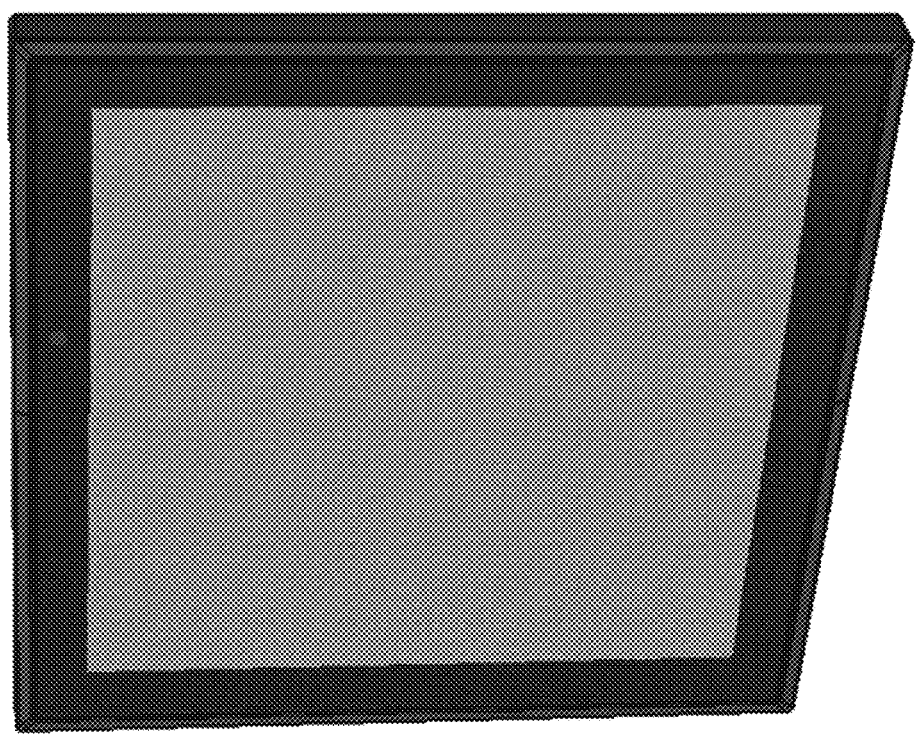
FIG. 2 illustrates how assembled dimmer looks on the wall.
Figure 3:
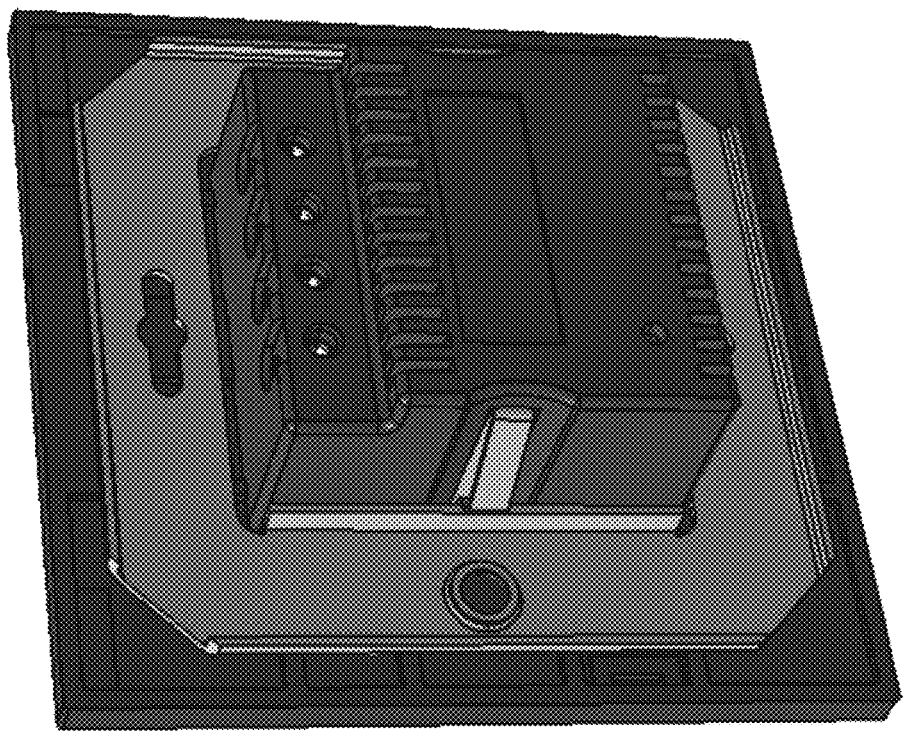
FIG. 3 illustrates back view of the assembled dimmer.
Figure 4:
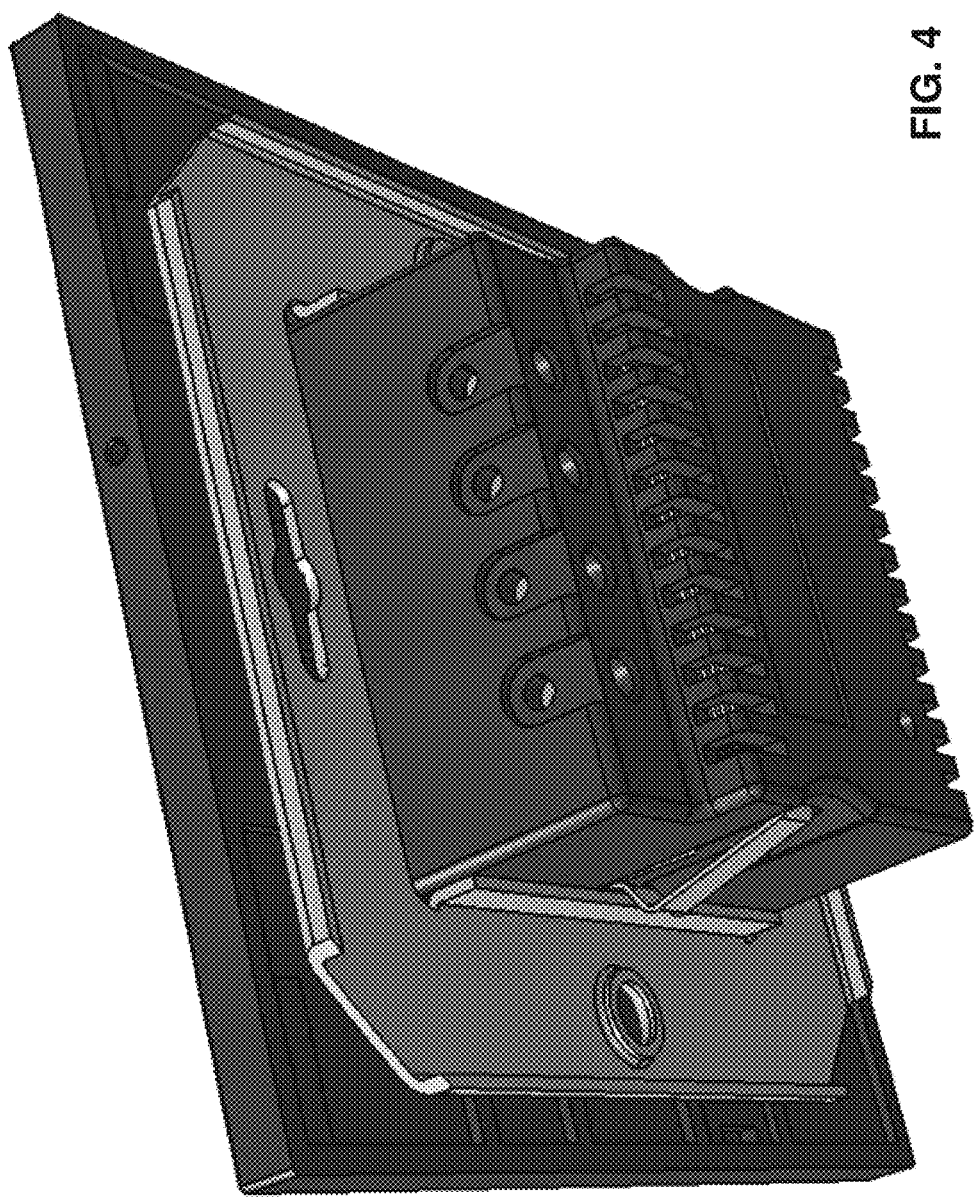
FIG. 4 illustrates the assembled dimmer shown from the top.
Figure 5:
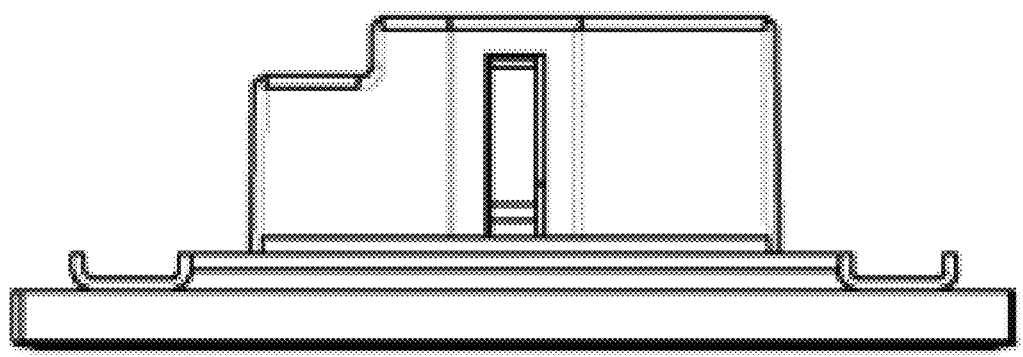
FIGS. 5 and 6 illustrate vertical and horizontal side views of an exemplary dimmer.
Figure 6:
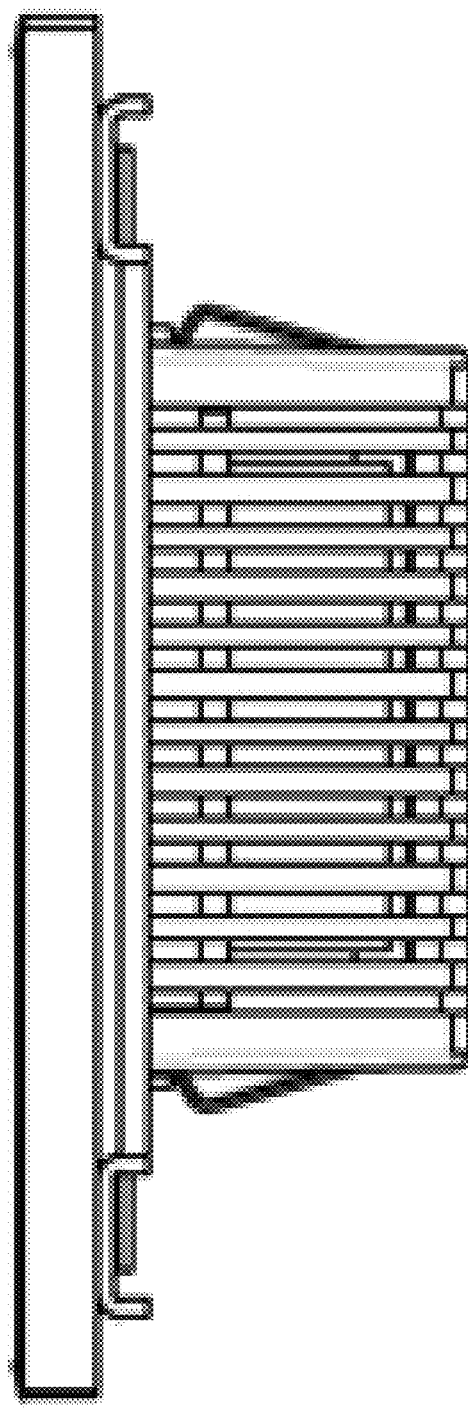
Figure 7:
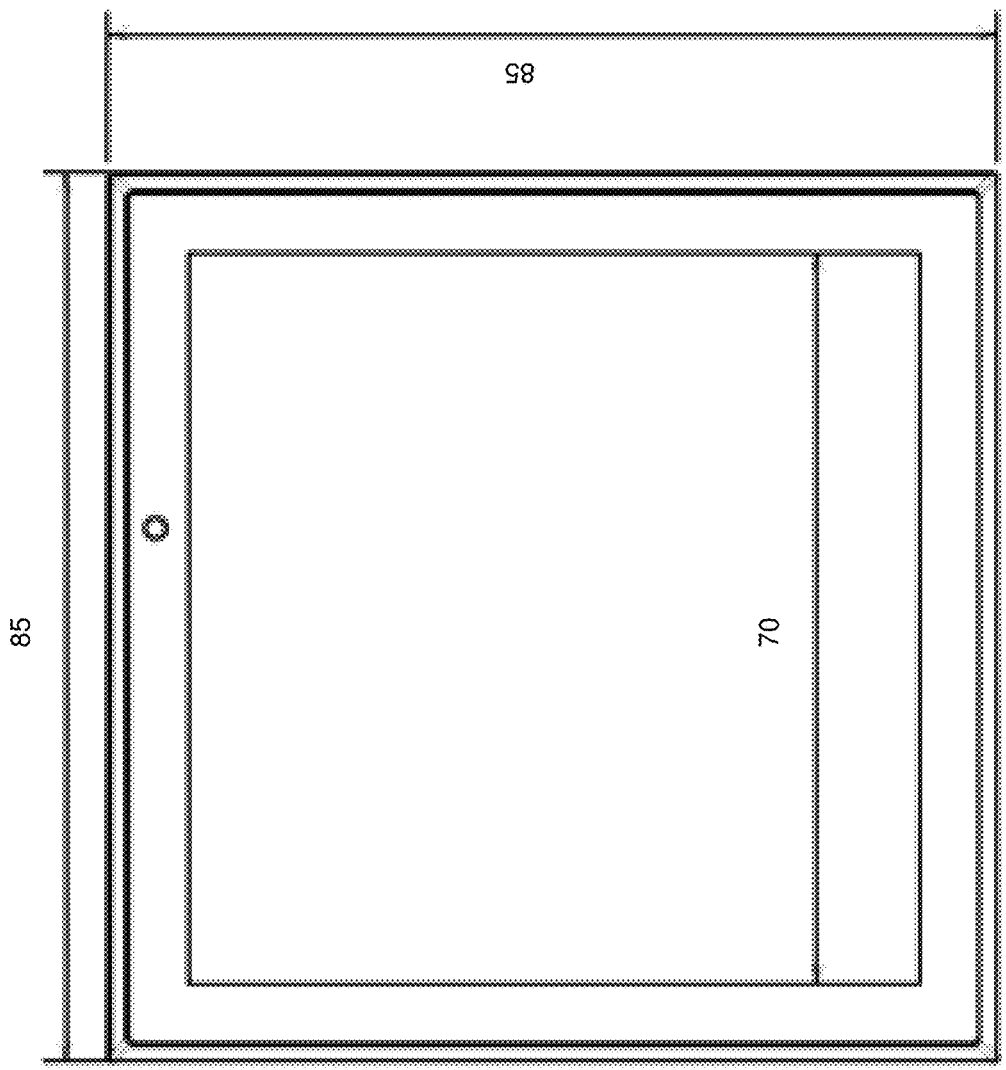
FIG. 7 illustrates an exemplary dimensions of a color sensor screen.
Figure 8:
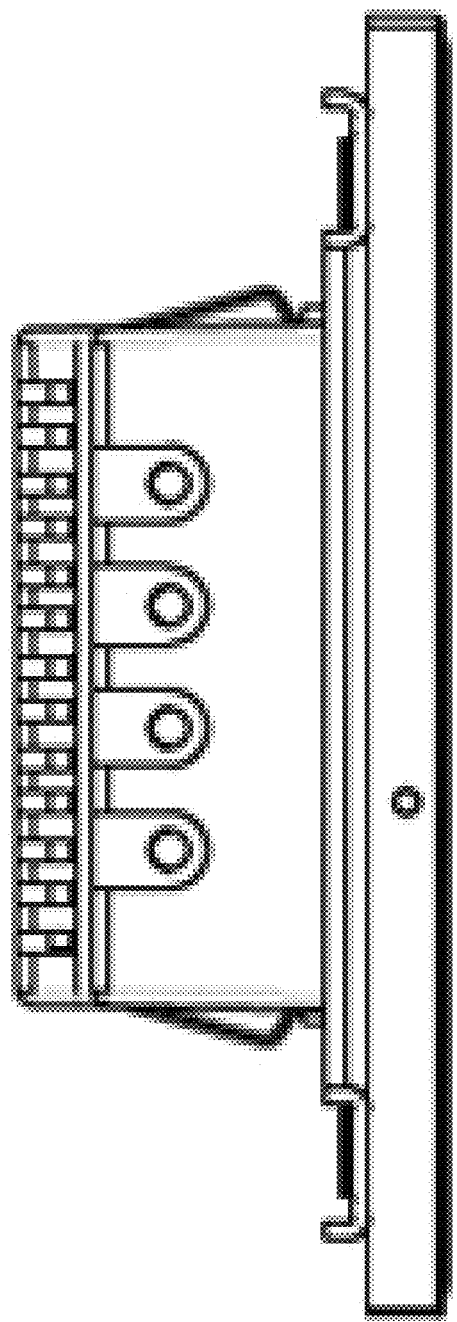
FIG. 8 illustrates a left side view of the dimmer having exemplary dimensions shown in FIG. 9.
Figure 9:
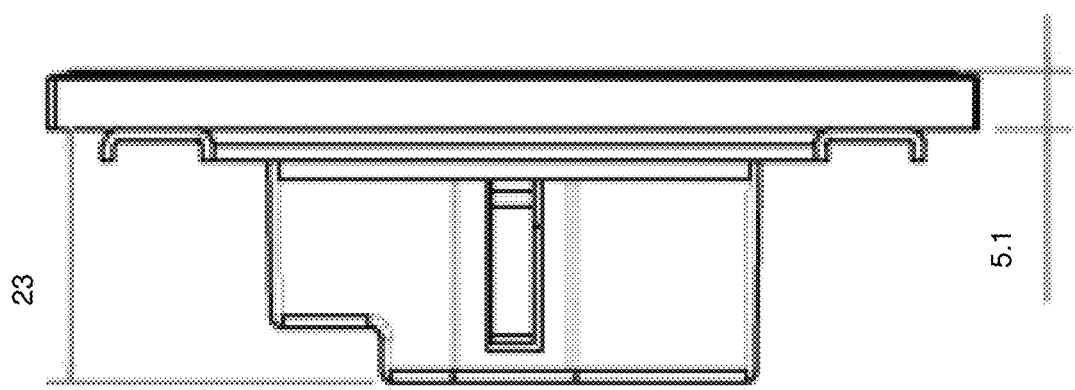
FIG. 9 illustrates another side view of the dimmer of the present invention, with dimension (in mm) shown.
Figure 10:
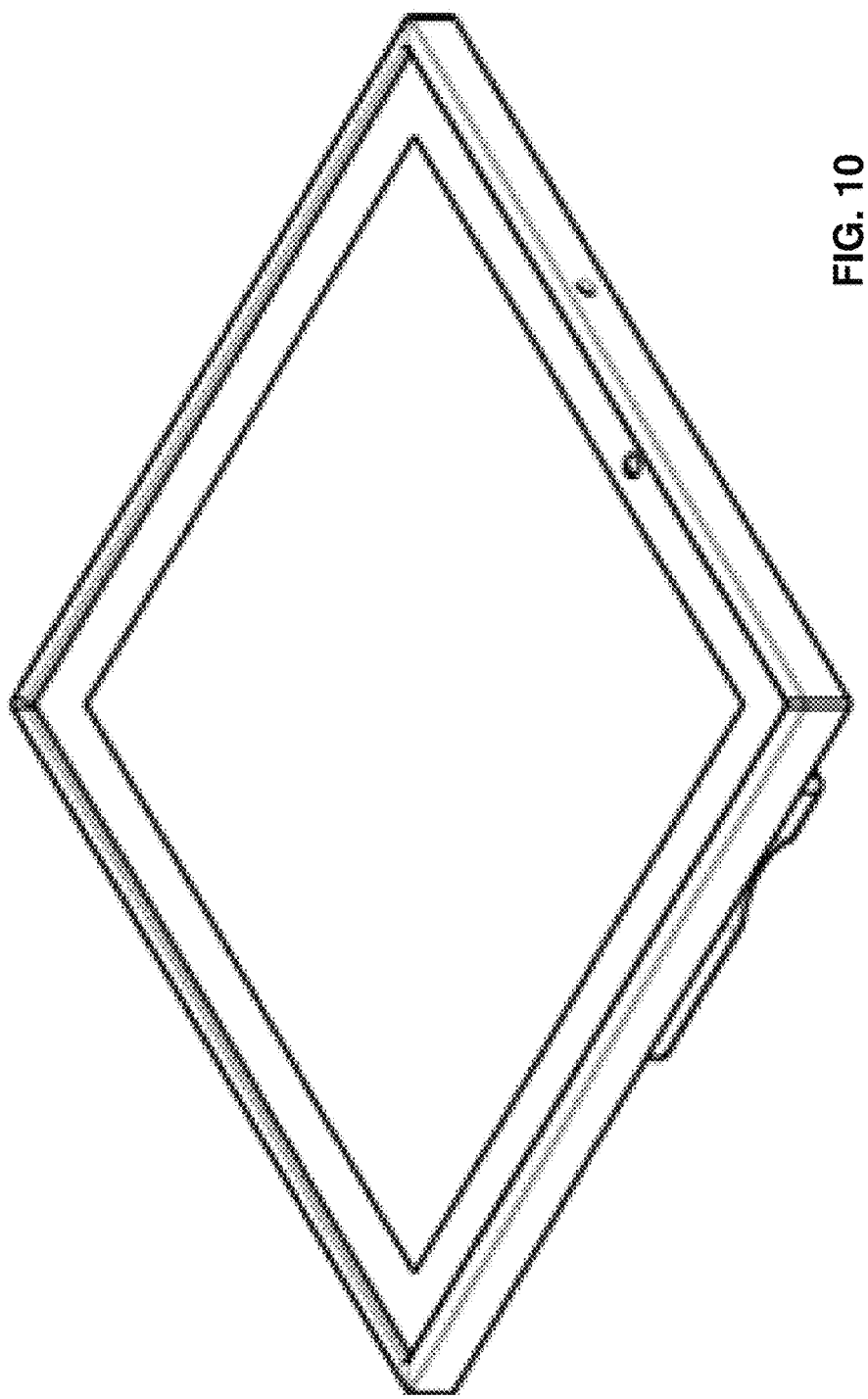
FIG. 10 illustrates a color sensor display.
Figure 11:
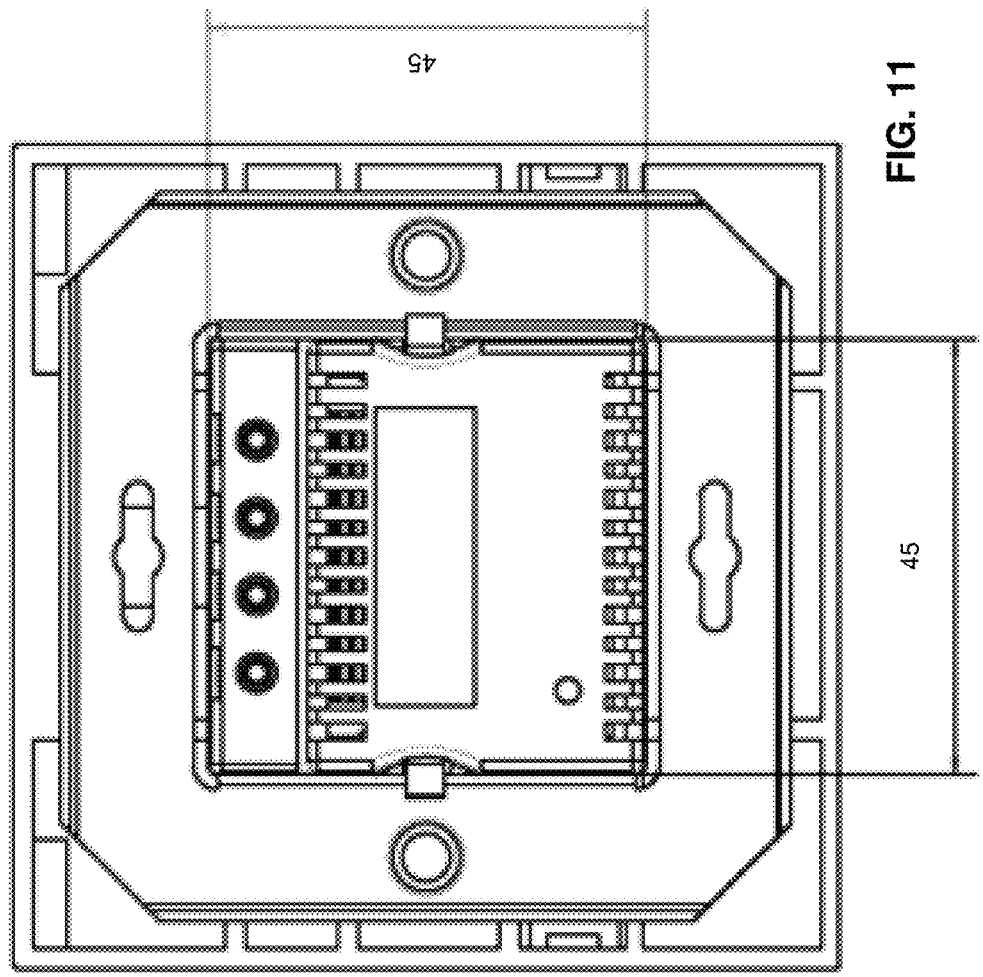
FIG. 11 illustrates a dimmer assembly with the exemplary dimensions.

FIG. 2 illustrates how assembled dimmer looks on the wall. FIG. 3 illustrates back view of the assembled dimmer. The dimmer fits into a wall pocket with the display facing outwards. FIG. 4 illustrates the assembled dimmer shown from the top. FIGS. 5 and 6 illustrate vertical and horizontal side views of an exemplary dimmer. FIG. 7 illustrates an exemplary dimensions of a color sensor screen depicted in FIG. 10. FIG. 8 illustrates a left side view of the dimmer having exemplary dimensions shown in FIG. 9. FIG. 11 illustrates a dimmer assembly with the exemplary dimensions.

Figure 14:
FIGS. 14, 15 illustrate the display screen of the dimmer having the same stand-by display as the wall texture and pattern.
Figure 15:
Figure 17:
FIG. 17 illustrates the display screen of the dimmer having the same stand-by display as the wall texture and pattern.
Figure 18:
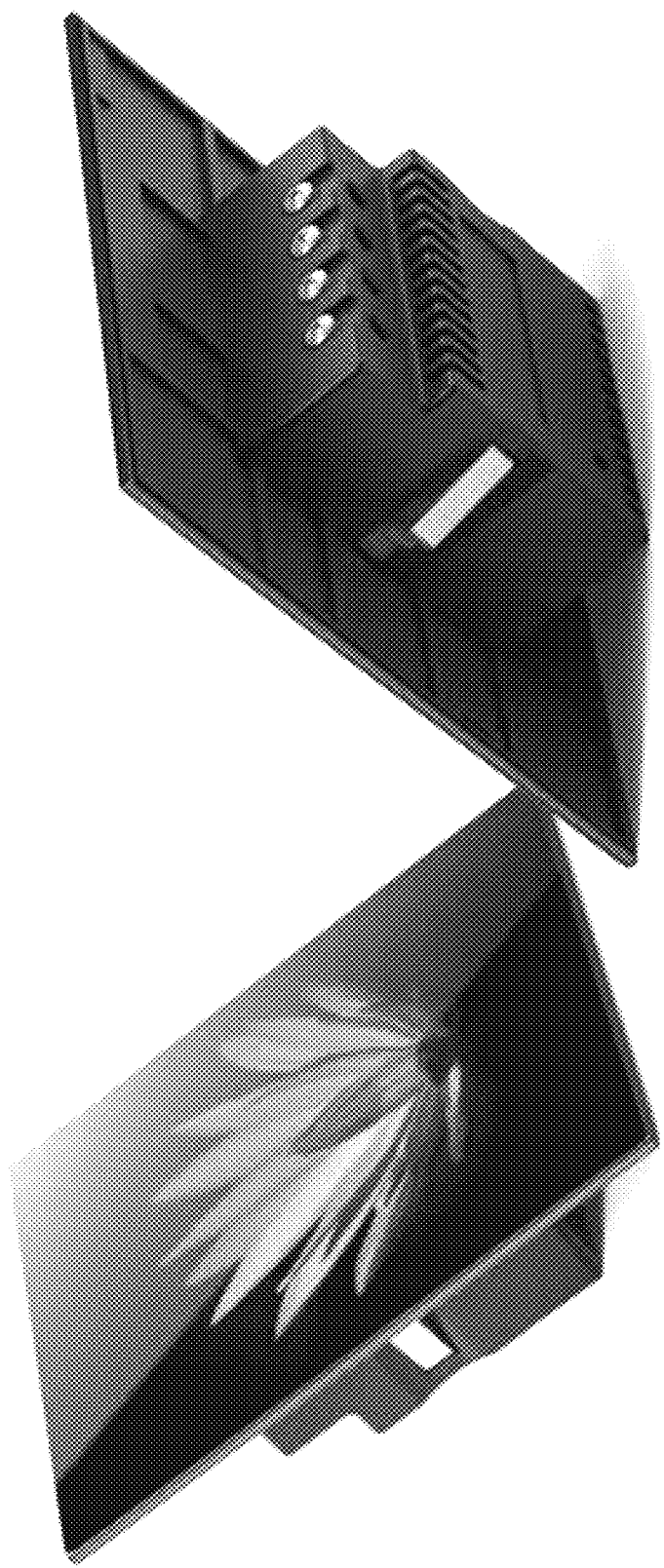
FIG. 18 illustrates the assembled dimmer shown in isometric view.

According to one exemplary embodiment, the dimmer display is positioned flush or nearly flush with the wall. According to the exemplary embodiment, the dimmer appears to be fully "merged" into the wall as shown in FIGS. 14 and 15. The patterns of the wall (e.g., lines, colors, texture, etc.) are replicated on the display, so that the boundary between the display and the wall is substantially or nearly invisible. The dimmer display screen can show a raster image of the texture of the wall, e.g., of the wallpaper, or of the brick or stone texture, etc. (see FIGS. 14 and 15). Note in particular that a thin display frame (bezel) emphasizes the ability to dissolve into the interior design.

The dimmer device supports all major formats for imaging, such as *.gif, *.png, *.jpeg, *.jpg, *.bmp, etc. Once an image of the wall is taken, it can be transmitted to the device through a wireless or X10 connection, or through web-interface using a browser. Alternatively, a picture of the wall can be taken by a mobile device (e.g., iPhone or iPad) and sent to the dimmer via Wi-Fi or Bluetooth, for example.

According to the exemplary embodiment, the dimmer can use default view settings. A user can select colors from standard color scales, such as RAL, RR, NSC, PMS (Pantone), as well as RGB and CMYK. The user can set the display "stand-by" color and screensaver. The user can define the size/scale of the dimmer screen image and its contrast. The stand-by image is normally displayed on the screen of the dimmer when the user is not performing operations with the controls of the dimmer. According to one exemplary embodiment, the dimmer can be used as a night light—the screen remains lit at night, for example, at 80-90% of its brightness for one or two hours.

A built-in motion sensor of the dimmer can detect the presence of objects or people within a pre-set range of the dimmer device. For example, when user's hand is brought close to the dimmer display (e.g., 20 cm or closer), the dimmer screen gradually changes, as the hand gets closer. The screen image changes from the stand-by image to a screen image with icons of the interface menu, as shown in FIG. 16. The time for returning to the stand-by mode can be set by the user. The user can perform some touch screen actions and within, for example, 10 or 20 seconds, the display returns to the screensaver view. Alternatively, the dimmer's screen turns off or becomes "invisible" by displaying the wall image as shown in FIGS. 14, 15, 17 and 20.

In a further embodiment, all or some of smart home or IoT wireless protocols can be supported for other smart home and IoT device interconnections, such as ZigBee, Thread, Wave, WeMo, etc. NFC (near field communications) can also be supported. The dimmer can also support integration with smart doorbells (like Ring, SkyBell, etc.) and smart locks, as well as integration with smart thermostats. The dimmer can also support voice intercom between rooms, between room and mobile or web or computer application. Using the dimmer, scene configuration and management (e.g., combination of lights of particular levels and colors) in other room in the house controlled by the any of the dimmers, can be implemented.

All the dimmers/switches in a house can be interconnected by a wireless or wire network. They can create the network in a house themselves (for example, interconnect through power lines and create WiFi access points throughout the house) or they can connect to an existing network (WiFi, or other wireline or wireless network)

Having thus described a preferred embodiment, it should be apparent to those skilled in the art that certain advantages of the described method and apparatus have been achieved. In particular, those skilled in the art would appreciate that the proposed apparatus provides a convenient dimmer equipped with a color multi-touch display.

It should also be appreciated that various modifications, adaptations and alternative embodiments thereof may be made within the scope and spirit of the present invention. The invention is further defined by the following claims.

What is claimed is:

1. A wall-mountable dimmer comprising:
a housing;
a processor inside the housing;
a color sensor display controlled by the processor,
wherein, the color sensor display, in a quiescent state, displays a raster image that matches a pattern of a wall on which the dimmer is mounted, wherein a pattern on the display is aligned with the pattern of the wall so as to make the dimmer substantially invisible in the quiescent state, and
wherein the raster image is received via a wireless connection;
a sensor configured to detect a person, wherein, in response to the detection by the sensor, the color sensor display displays an icon-based graphical user interface,
wherein the dimmer is configured to communicate with other dimmers such that environmental parameters in other rooms, where the other dimmers are located, can be controlled from the dimmer.

2. The dimmer of claim 1, wherein the dimmer is controllable remotely by a mobile device, including controlling the environmental parameters.

3. The dimmer of claim 1, further comprising an ambient light sensor.

4. The dimmer of claim 1, wherein the sensor includes a proximity sensor configured to detect the person within a pre-set proximity of the dimmer.

5. The dimmer of claim 1, further comprising a microphone.

6. The dimmer of claim 1, further comprising a sound speaker.

7. The dimmer of claim 1, further comprising a temperature sensor.

8. The dimmer of claim 1, further comprising a humidity/moisture sensor.

9. The dimmer of claim 1, wherein dimmer includes a processor that is located on a motherboard.

10. The dimmer of claim 9, further comprising a flash memory located on the motherboard.

11. The dimmer of claim 9, further comprising an audio processor and/or video processor located on the motherboard, with a sound quality and a performance suitable for compatible devices.

12. The dimmer of claim 1, further comprising a touch screen controller for control of the color sensor display.

13. The dimmer of claim 1, wherein the dimmer includes a front panel made of glass, plastic or sapphire glass.

14. The dimmer of claim 1, wherein the dimmer includes an LCD panel.

15. The dimmer of claim 1, wherein the dimmer includes an interface to any of the following:
thermostat;
wi-fi enabled camera;
smart doorbell;
remote microphones;
devices that include cameras and speakers;
air-conditioning and heating devices; and
intercom.

16. A wall-mountable dimmer comprising:
a housing;
a color sensor display mounted on the housing,
wherein, the color sensor display, in a quiescent state, displays an image that matches a pattern of a wall on which the dimmer is mounted, wherein a pattern on the display is aligned with the pattern of the wall;
a sensor configured to detect a person, wherein, in response to the detection by the sensor, the color sensor display displays an icon-based graphical user interface with a plurality of touch-activated icons for control of dimmer functions,
wherein the dimmer is configured to communicate with other dimmers to control environmental parameters in other rooms.

17. The dimmer of claim 16, wherein the dimmer communicates with a doorbell and displays an image from a remote camera when the doorbell rings.

18. The dimmer of claim 16, wherein the dimmer determines occupancy of a room and controls environmental parameters based on the occupancy.

19. The dimmer of claim 16, wherein the dimmer acts as a wi-fi access point for other wi-fi enabled devices.

* * * * *